United States Patent [19]
Sato

[11] Patent Number: 6,064,432
[45] Date of Patent: May 16, 2000

[54] LIGHT QUANTITY CONTROL DEVICE

[75] Inventor: Osamu Sato, Saitama-ken, Japan

[73] Assignee: Canon Denshi Kabushiki Kaisha, Saitama-Ken, Japan

[21] Appl. No.: 08/999,818

[22] Filed: Jul. 25, 1995

Related U.S. Application Data

[63] Continuation of application No. 08/163,026, Dec. 6, 1993.

[30] Foreign Application Priority Data

Dec. 9, 1992 [JP] Japan .................................. 4-329548

[51] Int. Cl.⁷ .............................. H04N 5/238; H02P 5/00
[52] U.S. Cl. ........................................... 348/363; 318/268
[58] Field of Search ..................... 348/362, 363, 348/364; 318/268

[56] References Cited

U.S. PATENT DOCUMENTS

| | | | |
|---|---|---|---|
| 4,084,122 | 4/1978 | Gettings | 318/696 |
| 4,134,653 | 1/1979 | Ishiguro et al. | 354/42 |
| 4,472,743 | 9/1984 | Ogasaware et al. | 358/228 |
| 4,651,216 | 3/1987 | Arai et al. | 348/364 |
| 5,072,162 | 12/1991 | Sato et al. | 318/268 |

FOREIGN PATENT DOCUMENTS

| | | | |
|---|---|---|---|
| 0492617 | 7/1992 | European Pat. Off. | G03B 7/10 |
| 2440038 | 5/1980 | France | G08B 5/24 |

*Primary Examiner*—Wendy Garber
*Assistant Examiner*—Andrew B. Christensen
*Attorney, Agent, or Firm*—Robin, Blecker & Daley

[57] ABSTRACT

A light quantity control device includes a motor, a light quantity control member arranged to be moved by the motor used as a drive source, a speed detecting part arranged to form speed information by using information on a change of the position of the light quantity control member, a first circuit arranged to generate a first control voltage for the motor, taking the speed information into consideration, and a second control circuit arranged to generate a second control voltage for the motor, the second control voltage being opposite in polarity to the first control voltage and having the same absolute value as the first control voltage.

13 Claims, 4 Drawing Sheets

LIGHT QUANTITY CONTROL DEVICE

This is a continuation application under 37 CFR 1.62 of prior application Ser. No. 08/163,026, filed Dec. 6, 1993.

BACKGROUND OF THE INVENTION

1. Field of the Invention

This invention relates to a light quantity control device adapted for use in an optical apparatus such as a camera, an observation apparatus, a projection-type television set, or the like.

2. Description of the Related Art

The conventional diaphragm device mounted on a video camera or the like has, as shown by way of example in FIGS. 3 and 4, diaphragm blades 37 and 38 arranged as light quantity control members and a motor 1 for bringing a quantity of light to a desired quantity by driving and controlling the diaphragm blades 37 and 38. The motor 1 is arranged to be controlled by a motor control voltage Vc outputted from a comparison computing circuit 6 arranged to compare a light quantity control signal Vs with a speed control signal. The motor 1 is provided with a rotor magnet 2, a driving coil 3 for rotating the rotor magnet 2, a damping coil 4 for detecting the rotational speed of the rotor magnet 2 and a Hall element 5 for detecting the position of rotation of the rotor magnet 2. The device is arranged as follows: When the rotor magnet 2 rotates, a speed detection signal which is generated by the damping coil 4 is negatively fed back to the comparison computing circuit 6 via an amplification circuit 9. The motor control voltage Vc outputted from the comparison computing circuit 6 is applied to one terminal of the driving coil 3, while a ground level constant voltage is applied to the other terminal of the driving coil 3. The output of the Hall element 5 which detects the rotation position of the rotor magnet 2 by detecting changes in density of the magnetic flux of the rotor magnet 2 is inputted as an aperture value signal Vo to an exposure control circuit (not shown) through a differential amplifier 8.

FIG. 4 shows the mechanical arrangement of the conventional diaphragm device described above. Referring to FIG. 4, a printed circuit board 31 is provided for the motor 1. A motor cap 32 is arranged to serve as a bearing plate for supporting one of shafts of the rotor magnet 2. A yoke 33 which is made of a ferromagnetic material is arranged to form a magnetic circuit in conjunction with the rotor magnet 2. A diaphragm base plate 34 is provided with an aperture part 34a and arranged to have the motor 1 secured thereto. A spring 35 is arranged to drive the diaphragm blades 37 and 38 in one direction through a driving arm 36. The driving arm 36 transmits the driving force of the rotor magnet 2 and that of the spring 35 to the diaphragm blades 37 and 38. A cover 39 is provided with an aperture part 39a. The diaphragm blades 37 and 38 have diaphragm aperture parts 37a and 38a formed respectively therein.

A quantity of light passing through the aperture parts 34a and 39a is controlled by driving the diaphragm blades 37 and 38 with the driving force of the rotor magnet 2 and that of the spring 35 through the driving arm 36 to vary the area of an aperture formed jointly by the diaphragm aperture parts 37a and 38a of the two diaphragm blades 37 and 38.

When the motor control voltage Vc is applied to the driving coil 3, the rotor magnet 2 rotates in the direction of opening the diaphragm aperture (increasing the area of the aperture) to drive the diaphragm blades 37 and 38 to move in the aperture opening direction through the driving arm 36. In closing the diaphragm aperture, the diaphragm blades 37 and 38a are driven by the spring force of the spring 35.

The conventional diaphragm device, however, always necessitates a sufficient torque for overcoming the spring force of the spring 35 in causing the diaphragm blades 37 and 38 to move in the direction of opening the diaphragm aperture. Hence, the device has presented the following problems:

(i) The necessity of a sufficient torque for overcoming the spring force of the spring 35 inevitably causes an increase in size of the motor 1 and, hence, an increase in power consumption, which are contrary to the object of designing.

(ii) In order to always obtain the torque counteracting the spring force of the spring 35, it is necessary to apply a large current to the driving coil 3. This causes a magnetic flux produced from the driving coil 3 to come into the Hall element 5 to lower the accuracy of detection of the position of the rotor 2. Further, the Hall element 5 is affected by an excitation noise which results from the mutual induction of the driving coil 3 and the damping coil 4, degrading the S/N ratio of the aperture value signal Vo, and, as a result, the diaphragm device or the camera tends to be caused to malfunction.

SUMMARY OF THE INVENTION

It is one aspect of this invention to provide a light quantity control device which is drivable at a low voltage. To attain this advantage, the device according to this invention is provided with means for generating a speed control signal from a position detection signal obtained by detecting the linear position of a rotor, means for generating a motor control voltage by computing and comparing a light quantity control signal and the speed control signal with each other, and means for forming, from the motor control voltage, a control voltage which is opposite in polarity to the motor control voltage and which has the same absolute value as the motor control signal.

The above and other aspects and features of this invention will become apparent from the following detailed description of an embodiment thereof taken in connection with the accompanying drawings.

DETAILED DESCRIPTION OF THE PREFERRED EMBODIMENT

Figure 1:
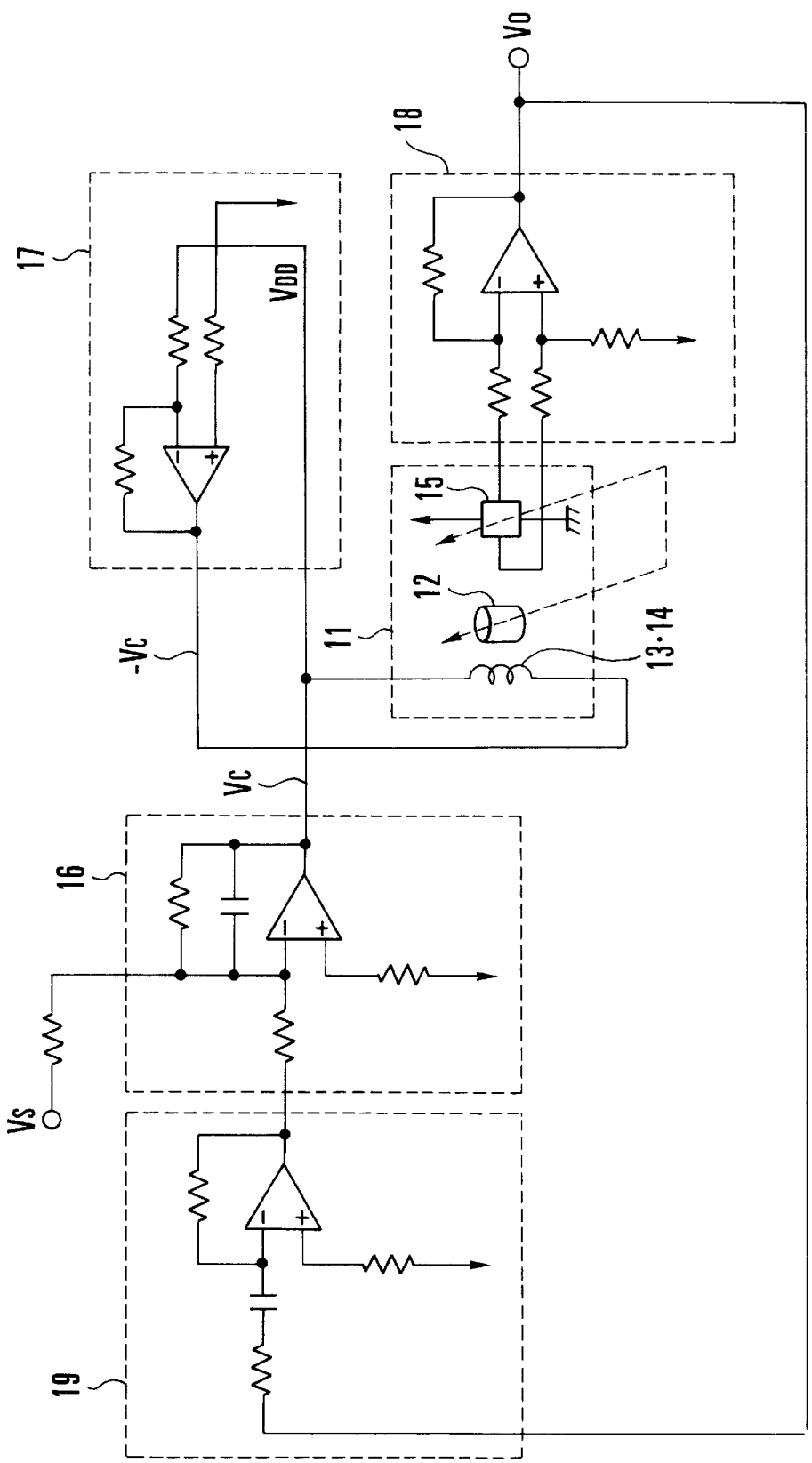
FIG. 1 is a circuit diagram showing a control system included in a light quantity control device which is an embodiment of this invention.

FIG. 1 shows the arrangement of a light quantity control device arranged by way of example as an embodiment of this invention. Referring to FIG. 1, a motor 11 includes a rotor magnet 12. The rotor magnet 12 is magnetized to have two poles in a radial direction and is arranged to drive and control light quantity control members (diaphragm blades) 27 and 28 shown in FIG. 2. Driving coils 13 and 14 are provided for rotating and driving the rotor magnet 12 by a voltage difference between a motor control voltage Vc which is an output of a comparison computing circuit 16 and and a motor control voltage −Vc which is an output of an inverting amplifier circuit 17 (because the motor control voltage Vc is applied to one end of each of the coils 13 and 14 while the motor control voltage −Vc is applied to the other end). A Hall element 15 is arranged to detect the rotation position of the rotor magnet 12 by linearly detecting the magnetic flux density of the rotor magnet 12 and to output an aperture value signal Vo through a differential amplifier 18. The comparison computing circuit 16 is arranged to compute and compare a speed control signal outputted from a differentiation circuit 19 with a light quantity control signal Vs and to output the motor control voltage Vc as a result of comparison. The inverting amplifier circuit 17 is arranged to invert the motor control voltage Vc outputted from the comparison computing circuit 16 with respect to a midpoint potential $V_{DD}$ and to apply to the driving coils 13 and 14 the above-stated control voltage −Vc which is opposite in polarity to the motor control voltage Vc and which has the same absolute value as the motor control voltage Vc. The differential amplifier 18 is arranged to amplify the output of the Hall element 15 and to output it as the aperture value signal Vo. The differentiation circuit 19 is arranged to form the speed control signal by using the aperture value signal Vo (linearly indicating the position of the rotor magnet 12).

Figure 2:
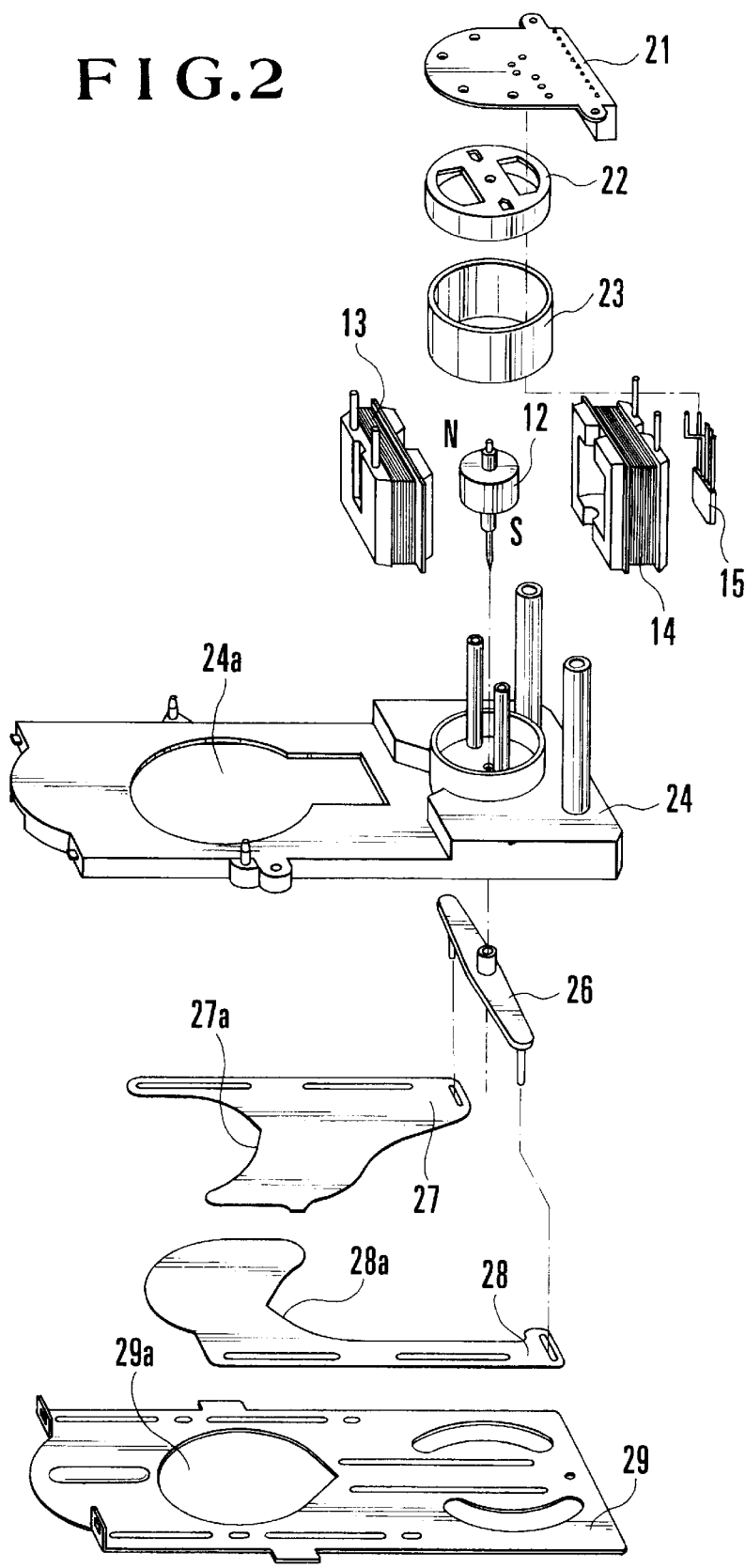
FIG. 2 is an exploded oblique view showing the mechanical arrangement of the light quantity control device having the control system of FIG. 1.

In FIG. 2 which shows the structural arrangement of the device, reference numeral 21 denotes a printed circuit board. A motor cap 22 serves as a bearing plate for supporting the shaft of the rotor magnet 12. A yoke 23 is made of a ferromagnetic material and is arranged to form a magnetic circuit in conjunction with the rotor magnet 12. A diaphragm base plate 24 has an aperture part 24a formed therein and the motor 11 secured thereto. A driving arm 26 is arranged to transmit the driving force of the rotor magnet 12 to the light quantity control members 27 and 28. A diaphragm cover 29 has an aperture part 29a and is arranged to accommodate the light quantity control members 27 and 28.

With the embodiment arranged in the above-stated manner, the light quantity control signal Vs and the speed control signal which is the output of the differentiation circuit 19 are made into the motor control voltage Vc by the comparison computing circuit 16. The motor control voltage Vc is inverted by the inverting amplifier circuit 17 with respect to the midpoint potential $V_{DD}$ to obtain and output the control voltage −Vc.

The driving coils 13 and 14 to which a voltage difference between the motor control voltages Vc and −Vc is applied are arranged to drive and control the rotor magnet 12 according to the voltage difference between the motor control voltages Vc and −Vc and the direction in which a current flows. As a result, the light quantity control members 27 and 28 are driven through the driving arm 26. With the light quantity control members 27 and 28 thus driven, the quantity of light passing through the aperture parts 24a and 29a are controlled to bring it to a desired quantity of light. The magnetic flux density of the rotor magnet 12 is linearly detected by the Hall element 15. The magnetic flux density thus detected is outputted through the differential amplifier 18 to be supplied as the aperture value signal Vo to an exposure control circuit or the like (not shown). The aperture value signal Vo which linearly represents the position of the rotator magnet 12 is inputted also to the differentiation circuit 19 to be negatively fed back to the comparison computing circuit 16 as the speed control signal, so that the light quantity controllability can be improved in respect of hunting, etc.

Voltages between the motor control voltages Vc and −Vc are applied to the driving coils 13 and 14. The maximum voltage width of these voltages becomes nearly the same as the voltage of a circuit power supply in the same manner as in the case of the conventional device. Change-over between forward and reverse rotations can be made by simply inverting the polarities of the motor control voltages Vc and −Vc. In that case, the maximum voltage width becomes also nearly the same as the voltage of the circuit power supply. In other words, with the circuit power supply assumed to be the same as the power supply of the conventional device, the arrangement of the embodiment permits switching between normal and reverse rotations without recourse to any spring, while keeping the motor control voltage at about the same level. Besides, controllability never deteriorates, by virtue of the arrangement of utilizing the control voltages applied to the driving coils.

Figure 3:
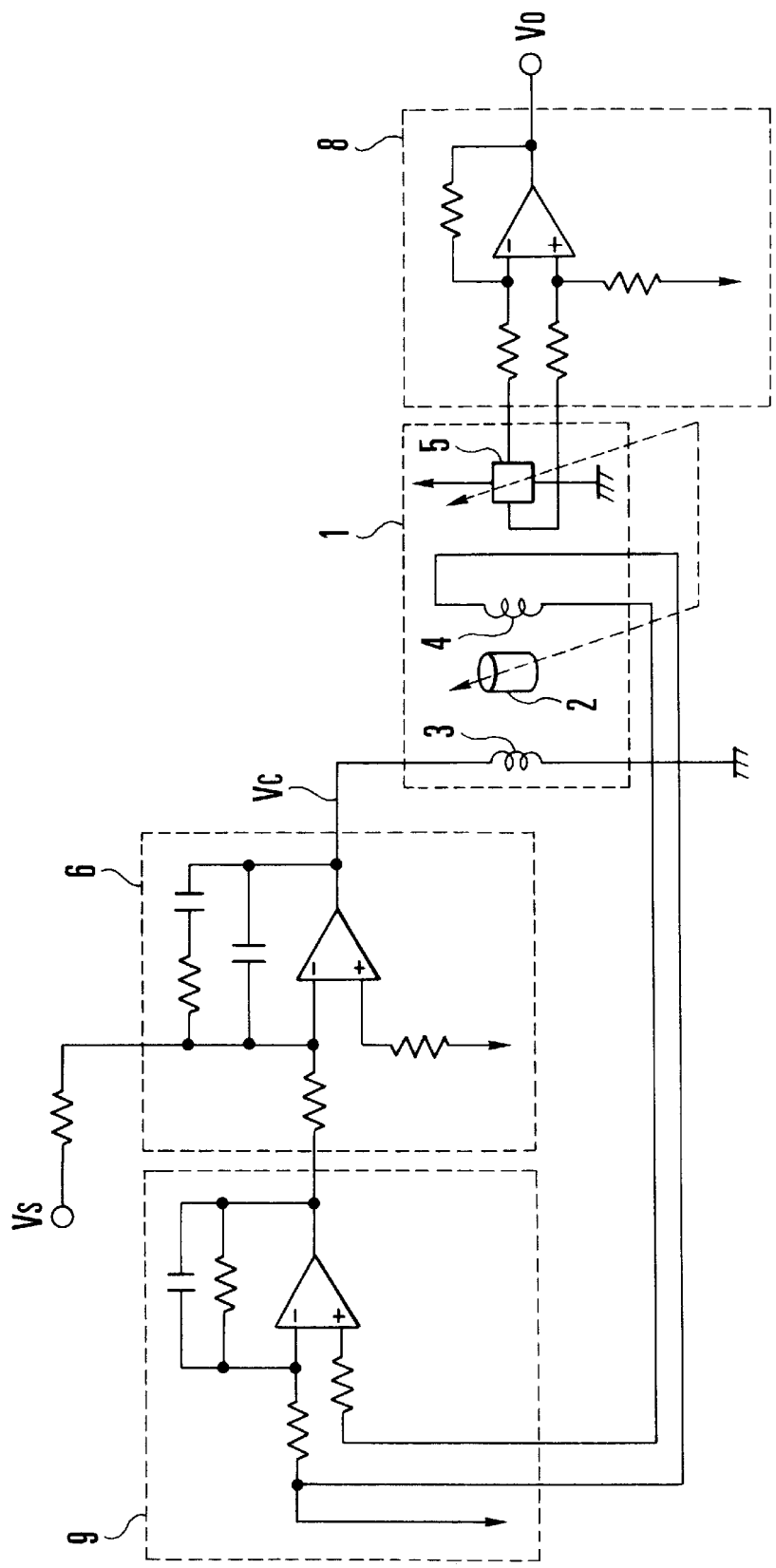
FIG. 3 is a circuit diagram showing a control system of the conventional light quantity control device.
Figure 4:
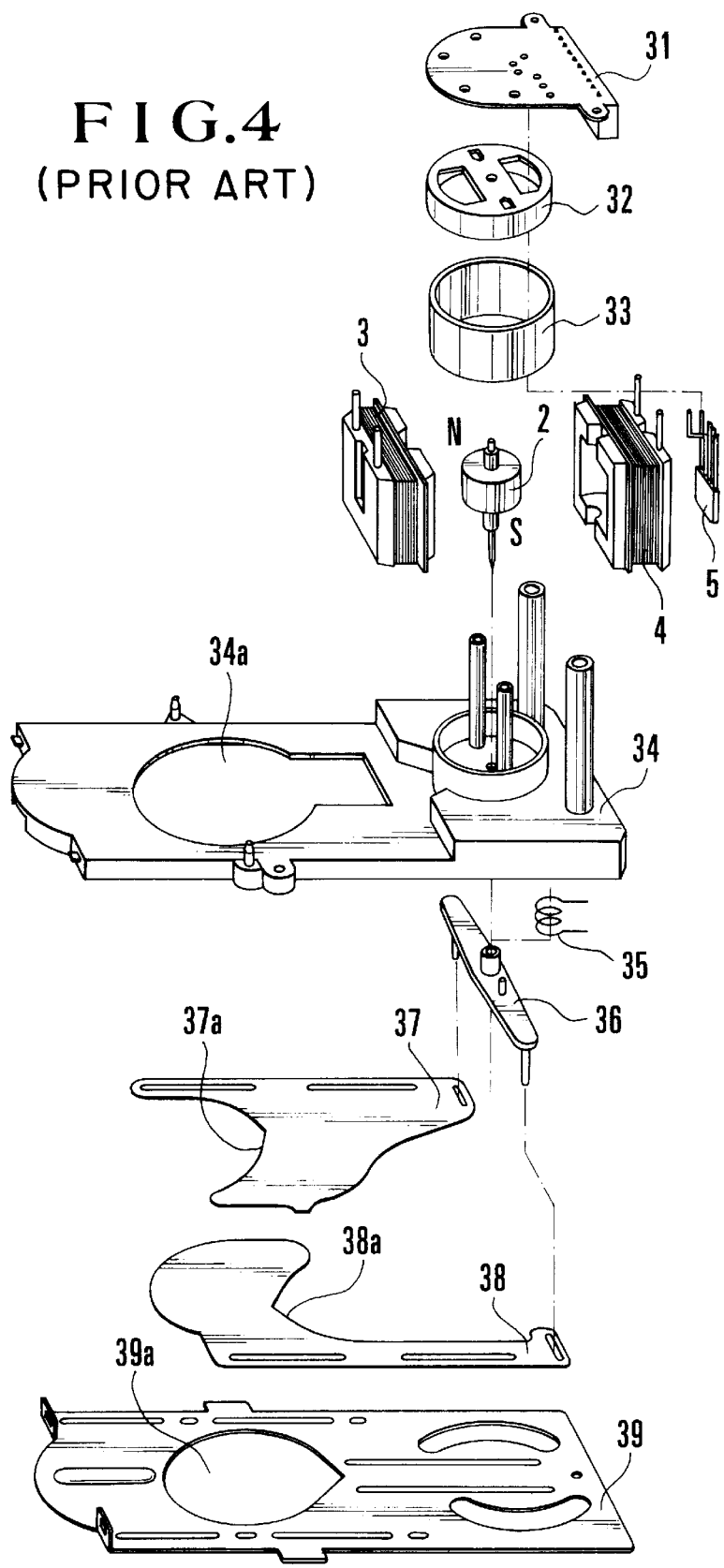
FIG. 4 is an exploded oblique view showing the mechanical arrangement of the conventional light quantity control device.

In the case of the conventional device shown in FIG. 3, the driving coil 3 is arranged to have the control voltage Vc applied to one end of it and a constant voltage of the ground level applied to the other end. This arrangement necessitates the control voltage Vc to be applied by making its polarity positive and negative relative to the constant voltage (ground level) instead of simply abolishing the use of the spring. The conventional arrangement, therefore, requires a voltage (positive and negative voltages) about twice as high as the voltage required by the arrangement of this invention and thus results in an increases in size and weight of the device.

Further, as described above, the embodiment is arranged to obtain the speed control signal by using the linear position signal of the Hall element. That arrangement obviates the necessity of the damping coil of the conventional device. In the case of the embodiment, a space otherwise occupied by the damping coil is utilized to further wind the driving coil for an increase in torque. That arrangement permits reduction in electric energy consumption as well as reduction in size and weight of the device. (The driving coils 13 and 14 are connected in series or in parallel).

Further, the embodiment can be arranged by simply omitting the damping coil, without including the driving coil 14. This modification gives an advantage that the output of the Hall element, i.e., the aperture value signal, can be obtained without any excitation noise that results from mutual induction between the coils.

Advantages attainable in accordance with the arrangement of the embodiment described are as follows:

(i) Since the spring can be omitted, the device permits reduction in size and weight of the motor and also reduction in the electric energy consumption. Further, the motor can be driven at a lower voltage.

(ii) Since it is not necessary to have a large current constantly flowing for the purpose of overcoming a large spring force, the excitation noise due to the coil exciting current can be reduced for improvement in S/N ratio of the output of the Hall element. Further, the arrangement of generating the speed control signal from the linear position signal of the Hall element permits improvement in the control characteristic.

(iii) Although the omission of the spring deteriorates the control characteristic relative to rattling and vibrations, the control can be more sensitively and finely carried out against the rattling and vibrations than the control conventionally performed with the damping coil, because the Hall element is highly sensitive to the rattling and vibrations of the rotor magnet and the speed control signal is generated from the linear position signal of the Hall element.

(iv) The omission of the spring force generating part and the damping coil not only permits the reduction of cost but also lessens fluctuations in quality of the optical apparatus otherwise resulting from unevenness in characteristics of these parts.

(v) As mentioned above, the output of the Hall element can be obtained without the excitation noise resulting from mutual induction by virtue of the omission of the damping coil. Therefore, the S/N ratio of the aperture value signal and that of the speed control signal can be improved for improvement in the characteristic of control. Further, the driving coil can be wound further by utilizing a space used to be occupied by the damping coil. This permits an increase in torque by about 1.5 times, reduction in electric energy consumption by one half and reduction in volume of the motor part to ⅔ or thereabout. Therefore, in accordance with this invention, the diaphragm device and the optical apparatus can be arranged in a compact size and the consumption of electric energy can be lessened.

What is claimed is:

1. A light quantity control device comprising:
   a) a motor having a driving coil and a rotor;
   b) a light quantity control member arranged to be moved by said motor serving as a drive source;
   c) speed detecting means arranged to form speed information by using information on a change of the position of said light quantity control member;
   d) a first circuit arranged to generate a first control voltage for controlling said motor by taking said speed information into consideration, said first control voltage varying according to brightness of an object; and
   e) a second circuit arranged to invert said first control voltage and to generate a second control voltage for controlling said motor, the second control voltage being opposite in polarity to the first control voltage and having approximately the same absolute value as the first control voltage, wherein said first control voltage is applied directly to one end of said driving coil while said second control voltage is applied directly to the other end of said driving coil thereby driving said motor.

2. A device according to claim 1, wherein said rotor is formed with a permanent magnet which is magnetized to have P poles and arranged to be driven within the range of a rotation angle of 360°/P.

3. A device according to claim 1, wherein said speed detecting means includes a detecting element arranged to linearly detect the rotation position of said rotor and obtains the speed information by differentiating an output of said detecting element.

4. A device according to claim 3, wherein a Hall element is employed as said detecting element.

5. A device according to claim 1, wherein said first circuit is arranged to form the first control voltage by performing a computation to compare the speed information with light quantity control information.

6. A device according to claim 1, wherein said second circuit includes an inverting amplifier circuit arranged to invert the first control voltage with respect to a midpoint potential.

7. A light quantity control device comprising:
   a) a motor having a driving coil and a rotor;
   b) a light quantity control member arranged to be moved by said motor serving as a drive source;
   c) a first circuit arranged to generate a first control voltage for controlling said motor, said first control voltage varying according to brightness of an object; and
   d) a second circuit arranged to invert said first control voltage and to generate a second control voltage for controlling said motor, the second control voltage being opposite in polarity to the first control voltage and having approximately the same absolute value as the first control voltage, wherein said first control voltage is applied directly to one end of said driving coil while said second control voltage is applied directly to the other end of said driving coil thereby driving said motor.

8. A device according to claim 7, wherein said rotor is formed with a permanent magnet which is magnetized to have P poles and arranged to be driven within the range of a rotation angle of 360°/P.

9. A device according to claim 7, further comprising speed detecting means for forming speed information.

10. A device according to claim 9, wherein said speed detecting means includes a detecting element arranged to linearly detect the rotation position of said rotor and obtains the speed information by differentiating an output of said detecting element.

11. A device according to claim 10, wherein a Hall element is employed as said detecting element.

12. A device according to claim 7, wherein said first circuit is arranged to form the first control voltage by performing a computation to compare speed information with light quantity control information.

13. A device according to claim 7, wherein said second circuit includes an inverting amplifier circuit arranged to invert the first control voltage with respect to a midpoint potential.

* * * * *